(12) United States Patent
Haraguchi et al.

(10) Patent No.: US 11,550,042 B2
(45) Date of Patent: Jan. 10, 2023

(54) LASER RADAR SYSTEM

(71) Applicant: MITSUBISHI ELECTRIC CORPORATION, Tokyo (JP)

(72) Inventors: Eisuke Haraguchi, Tokyo (JP); Toshiyuki Ando, Tokyo (JP); Hitomi Ono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 671 days.

(21) Appl. No.: 16/492,551

(22) PCT Filed: Apr. 13, 2017

(86) PCT No.: PCT/JP2017/015135
§ 371 (c)(1),
(2) Date: Sep. 9, 2019

(87) PCT Pub. No.: WO2018/189863
PCT Pub. Date: Oct. 18, 2018

(65) Prior Publication Data
US 2021/0141067 A1  May 13, 2021

(51) Int. Cl.
*G01S 7/4865* (2020.01)
*G01S 7/48* (2006.01)
(Continued)

(52) U.S. Cl.
CPC ............ *G01S 7/4865* (2013.01); *G01S 7/484* (2013.01); *G01S 7/4814* (2013.01); *G01S 17/58* (2013.01)

(58) Field of Classification Search
CPC .............................. G01S 7/4865; G01S 7/4917
(Continued)

(56) References Cited

U.S. PATENT DOCUMENTS

2006/0071846 A1* 4/2006 Yanagisawa ............ G01S 7/481
342/54
2008/0304043 A1   12/2008 Benz et al.
2016/0291137 A1   10/2016 Sakimura et al.

FOREIGN PATENT DOCUMENTS

JP   58-135480 A   8/1983
JP   59-166884 A   9/1984
(Continued)

OTHER PUBLICATIONS

International Search Report (PCT/ISA/210) issued PCT/JP2017/015135, dated Jun. 27. 2017.
(Continued)

*Primary Examiner* — Jeffery A Williams
(74) *Attorney, Agent, or Firm* — Birch, Stewart, Kolasch & Birch, LLP (57) ABSTRACT

A laser radar system according to the present invention includes: a light source to output light having a first frequency in a first period and light having a second frequency in a second period; an optical splitter to split the lights, outputted from the light source, into signal light and local oscillator light; an optical modulator to modulate the signal light into pulsed light; an optical antenna to output the pulsed light into space and to receive, as reception light, the scattered light from a target; an optical heterodyne receiver to perform heterodyne detection on the reception light by using the local oscillator light; and a measurement unit to measure the distance to the target or the movement characteristics of the target by using the reception signal detected by the optical heterodyne receiver, wherein the optical heterodyne receiver performs the heterodyne detection on the first frequency of the reception light by using the second frequency of the local oscillator light. With this configuration, a large amount of frequency shift can be provided between the signal light and the local oscillator light, and (Continued)

thus, the distance to the target can be measured with high resolution by using short pulsed-light.

20 Claims, 6 Drawing Sheets

(51) Int. Cl.
    *G01S 7/481*     (2006.01)
    *G01S 7/484*     (2006.01)
    *G01S 17/58*     (2006.01)

(58) Field of Classification Search
    USPC .............................................................. 365/9
    See application file for complete search history.

(56) References Cited

FOREIGN PATENT DOCUMENTS

| JP | 2000-338246 A | 12/2000 |
| JP | 2009-115696 A | 5/2009 |
| JP | 2010-127840 A | 6/2010 |
| JP | 2015-129646 A | 7/2015 |

OTHER PUBLICATIONS

Extended European Search Report issued in corresponding European Application No. 17905724.5 dated Mar. 17, 2020.

\* cited by examiner

LASER RADAR SYSTEM

TECHNICAL FIELD

The present invention relates to a laser radar system which measures the distance to a target or the movement characteristics of a target.

BACKGROUND ART

In a laser radar system which sends and receives laser light to and from a target for measuring the distance to the target, a direct detection method in which an intensity-modulated signal is received or a heterodyne detection method capable of receiving a signal with high sensitivity has been used.

In the conventional direct detection method, there has been a problem in that the thermal noise is dominant and it degrades the reception sensitivity. In a configuration in which heterodyne detection on pulsed light is performed for high-sensitivity reception (for example, Patent Document 1), a modulator is required to shift a frequency of transmission light or local oscillator light, bringing difficulties in downsizing or integration. Also, there is a disclosure of a laser radar system which performs heterodyne detection using intensity-modulated signal light (for example, Patent Document 2). In the disclosed technology, the frequency of the intensity-modulated signal is equivalent to Doppler frequency; therefore, it is difficult to apply the technology to pulsed light.

In a laser radar system of a pulse type, the pulse width of the pulse signals determines the resolution of the distance measurement. In order to perform heterodyne detection on the pulse signals, a frequency difference between the signal light and the local oscillator light has to be provided so as to be able to cope with the pulse signals.

PRIOR ART DOCUMENTS

Patent Documents

Patent Document 1: Unexamined Patent Application Publication JP, 2000-338246, A
Patent Document 2: Unexamined Patent Application Publication JP, 2015-129646, A

SUMMARY OF THE INVENTION

Problems to be Solved by the Invention

In the conventional laser radar system of pulse type, it has been difficult to realize a large frequency shift because the frequency difference between signal light and local oscillator light is limited by the modulation frequency of its optical frequency shifter. As a result, it is difficult to give large frequency shifts to the signal light and the local oscillator light for performing the heterodyne detection, making it difficult to cope with the pulse signals with short pulse widths. To be more specific, in order to cope with pulse signals having short pulses in nanoseconds, it is necessary to realize a frequency shift of gigahertz-level or more; however, in the conventional techniques, it has been difficult to realize a frequency shift of gigahertz-level or more.

The present invention is devised to solve the problem described above. The purpose is to provide a laser radar system which gives a large frequency shift between signal light and local oscillator light, and then performs heterodyne detection on the scattered light, coming from a target and being a pulse signal having short pulse widths, so that the laser radar system can measure, with high resolution, the distance to the target or the movement characteristics of the target.

Solution to Problems

A laser radar system according to the present invention includes: a semiconductor laser to output first light having a first frequency in a first period and second light having a second frequency in a second period; an optical splitter to split the first light and the second light outputted from the semiconductor laser into signal light and local oscillator light; an optical modulator to modulate the signal light into pulsed light; an optical antenna to radiate the pulsed light modulated by the optical modulator into space and to receive, as reception light, scattered light of the pulsed light from a target: an optical heterodyne receiver to perform, using the local oscillator light, heterodyne detection on the reception light; and measurement circuitry to measure a propagation time of the scattered light from the target with its measurement stall time that is a time when the measurement circuitry detects internally-scattered-light which is caused by the pulsed light's scattering in the laser radar system and to thereby measure a distance to the target by using the reception signal detected through the heterodyne detection performed by the optical heterodyne receiver, wherein the optical heterodyne receiver performs heterodyne detection on the internally-scattered-light of the first light and the reception light of the first light by using the local oscillator light of the second light, and wherein a light path length of the internally-scattered-light is longer than a light path length of the local oscillator light.

Advantages of the Invention

According to the present invention, a frequency shift larger than that by conventional technologies can be given between signal light and local oscillator light to perform the heterodyne detection on the scattered light coming from a target and being a pulse signal having short pulse widths. Therefore, the distance to a target or the movement characteristics of the target can be measured with high resolution.

DESCRIPTION OF EMBODIMENTS

Embodiment 1

Hereinafter, embodiments of the present invention will be described.

In the present embodiment, a laser radar system 100 to measure the distance to a target 20 will be described.

Figure 1:
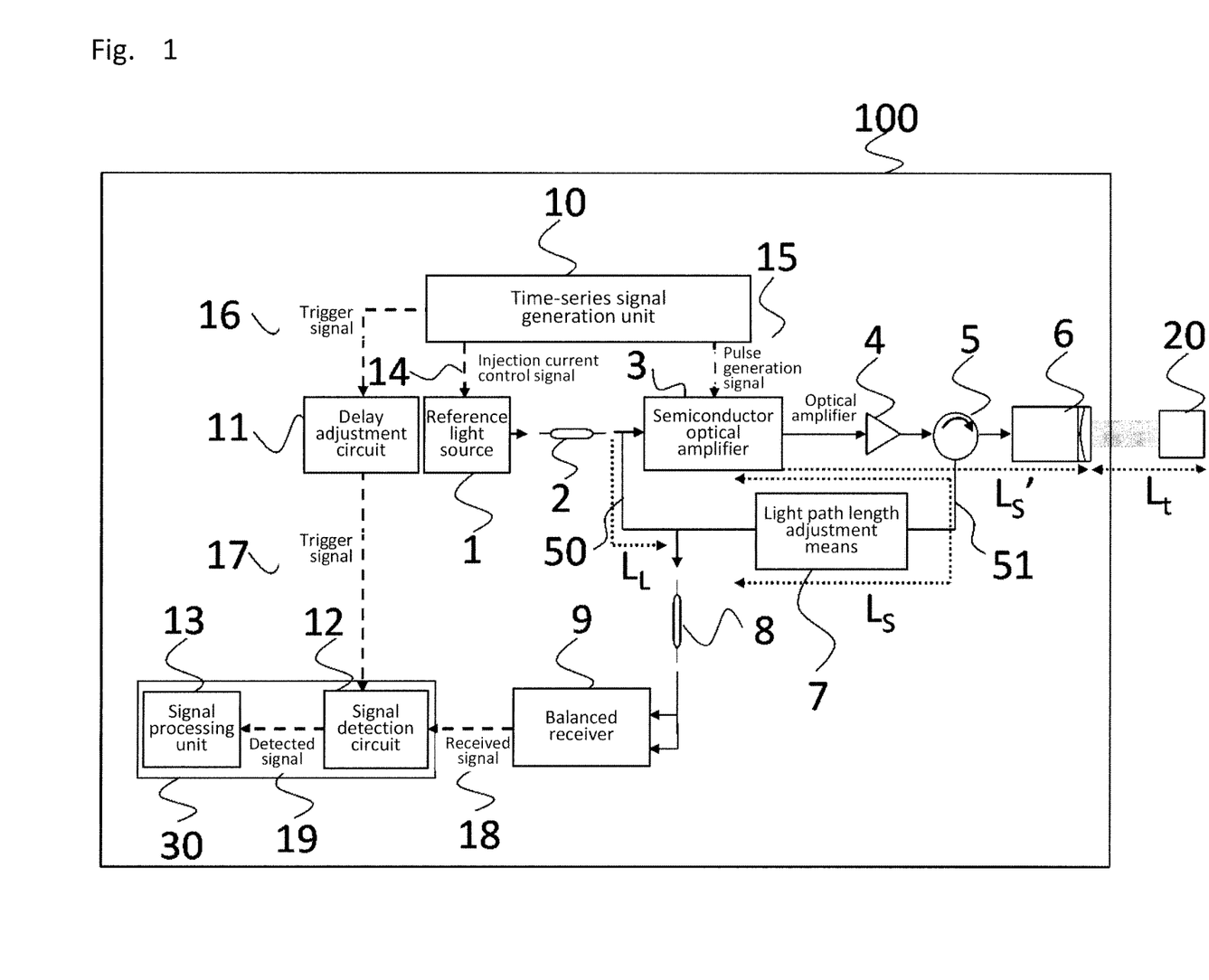
FIG. 1 is a configuration diagram showing a laser radar system 100 according to Embodiment 1 of the present invention.

FIG. 1 is a configuration diagram showing the laser radar system 100 according to Embodiment 1 of the present invention. The laser radar system 100 includes: a reference light source 1 which constantly oscillates to emit linearly polarized light with a single wavelength (single frequency); a polarization-keeping optical coupler 2 being an optical splitter to split a light path, through which the light generated by the reference light source 1 travels, into a signal light path and a local oscillator light path 50; a semiconductor optical amplifier 3 (SOA) to convert into pulsed light, light branched into the signal light path by the polarization-keeping optical coupler 2; and an optical amplifier 4 to amplify the pulsed light. The laser radar system further includes: an optical circulator 5 which isolates one signal light path from another by receiving the amplified pulsed-light to feed it into a signal light path and by feeding light received from the output-side of the signal light path into a reception light path 51; and an optical antenna 6 to output, as space light, the light which is outputted from the optical circulator 5 to the signal light path. The laser radar system further includes: a light path length adjustment means 7 which is a delay fiber or the like to adjust the light path length of the reception light received by the optical antenna 6 and outputted into the reception light path 51 by the optical circulator 5; an optical combining coupler 8 to combine local oscillator light being the light branched to the local oscillator light path 50 by the polarization-keeping optical coupler 2 and the reception light passing through the reception light path 51; a balanced receiver 9 to receive the combined optical signals and convert them into electric signals; and a measurement unit 30 to use the photo-electrically-converted reception signals to measure the distance to the target 20 or movement characteristics of the target 20. The laser radar system further includes: a time-series-signal generation unit 10 to generate an injection-current control signal 14 to be inputted into the reference light source 1 and used for performing light frequency modulation in the reference light source 1, a pulse generation signal 15 to be inputted into the semiconductor optical amplifier 3 and used for generating pulsed light in the semiconductor optical amplifier, and a trigger signal 16 to be inputted into a signal detection circuit 12 of the measurement unit 30 and used for starting a signal detection operation; and a delay adjustment circuit 11 to adjust the delay of the trigger signal 16. Also, the measurement unit 30 includes the signal detection circuit 12 for detecting a photo-electrically converted signal whose amplitude is equal to or larger than a threshold value, and also includes a signal processing unit 13 for processing the detected signal. In each of the figures used below, the same numerals indicate the same or equivalent components. The balanced receiver 9 is a typical component for an optical heterodyne receiver system, while it is possible for the laser radar system to include another type of receiver. Also, the semiconductor optical amplifier 3 is an example of an optical modulator for modulating the inputted light to obtain pulsed light, while another type of optical modulator can be used.

Figure 2:
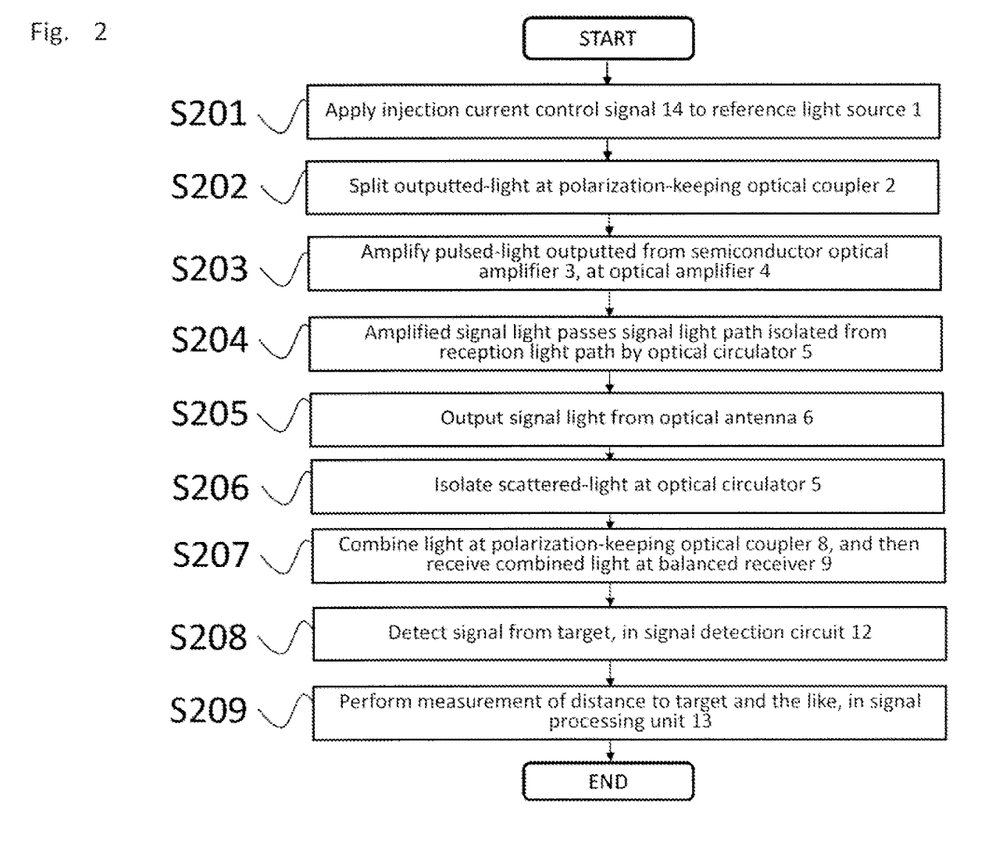
FIG. 2 shows an entire operation of the laser radar system 100 according to Embodiment 1 of the present invention.
Figure 3:
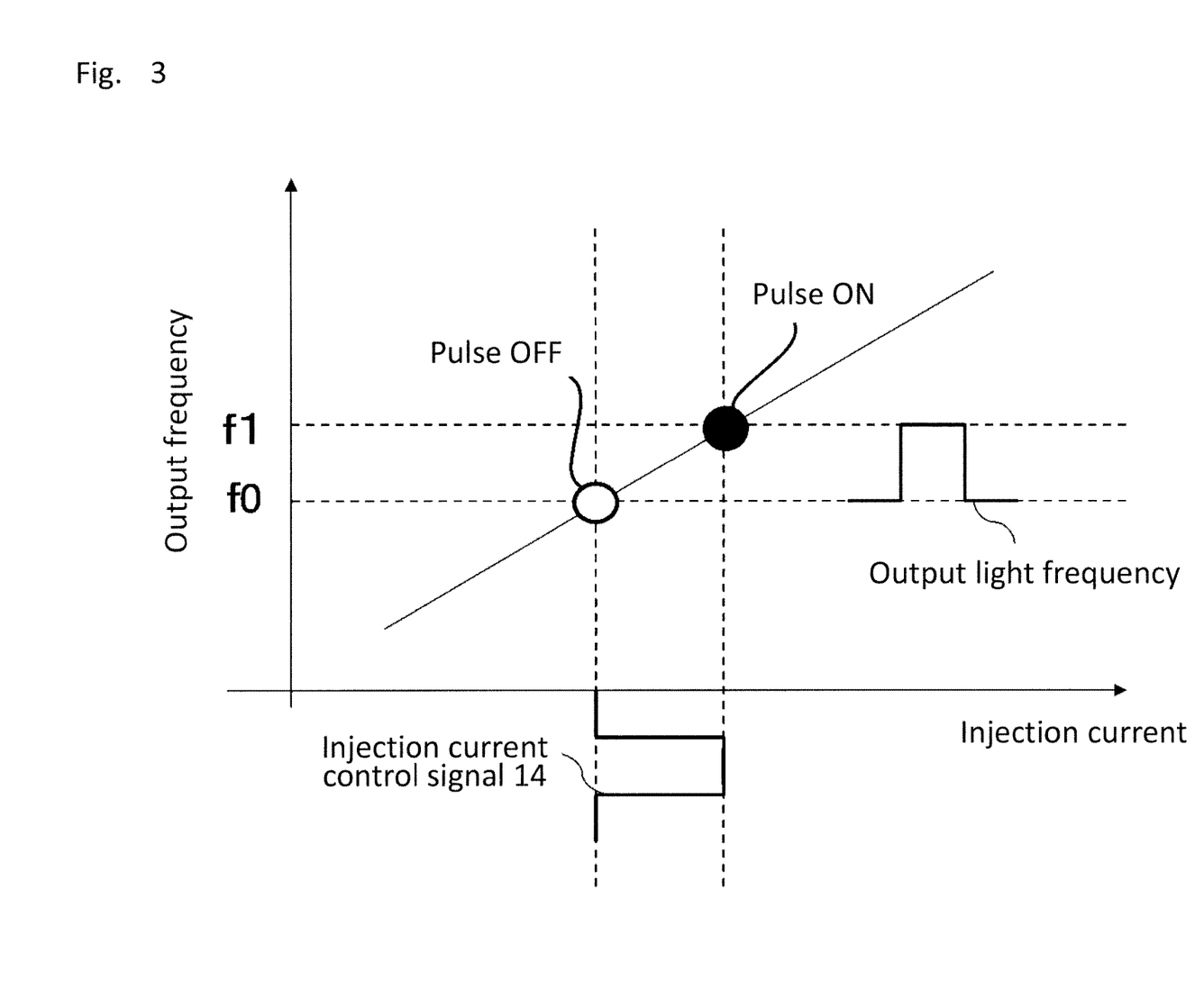
FIG. 3 is a graph for illustrating signals at a reference light source 1 according to Embodiment 1 of the present invention.

Hereinafter, the entire operation will be described. Here, a distributed feedback laser diode (DFB-LD) is used, for an example, for the reference light source 1. FIG. 2 shows an entire operation of the laser radar system 100. An injection-current control signal 14 is applied to the reference light source 1 from the time-series-signal generation unit 10 (S201). In the DFB-LD, the oscillation wavelength varies by the carrier plasma effect and the thermo-optical effect. FIG. 3 is a graph for illustrating signals at the reference light source 1. In accordance with the injection-current control signal 14 controlled in a burst pulse manner, the reference light source 1 outputs, during a pulse-ON period, light whose frequency is a first frequency f1, and the reference light source 1 outputs, during a pulse-OFF period, light whose frequency is a second frequency f0. In accordance with the injection-current control signal 14, the DFB-LD can perform quick switching between the pulse ON-period and the pulse-OFF period; therefore, a frequency shift of gigahertz-level or more can be realized by setting the first frequency f1 and the second frequency f0 so that their frequency difference will equal or exceed a frequency of gigahertz. A reference light source 1 such as a semiconductor laser which is other than DFB-LD and whose output light is able to be frequency-modulated by injection current control also realizes a frequency shift of gigahertz order or larger. It is well known for semiconductor lasers to realize fast modulation of gigahertz-level or faster.

At the polarization-keeping optical coupler 2, the light outputted from the reference light source 1 is split into light through the signal light path and light though the local-oscillator light path 50 (S202). The light split into the signal light path at the polarization-keeping optical coupler 2 is modulated into pulsed light by the semiconductor optical amplifier 3 which directly modulates using the pulse generation signal 15. The pulsed light outputted from the semiconductor optical amplifier 3 is amplified by the optical amplifier 4 such as an optical fiber amplifier (S203). The amplified signal light passes the signal light path being isolated from the reception light path by the optical circulator 5 (S204). The light passing through the signal light path is outputted, as collimated light, into space by the optical antenna 6 (S205).

The light outputted into space by the optical antenna 6 is scattered by the target 20. The scattered light is isolated from the signal light path by the optical circulator 5 and then enters the reception light path 51 (S206). In the reception light path, the light path length adjustment means 7 such as a delay fiber, a fiber stretcher, or an optical phase shifter is set so that the signal light path length $L_S$ of internally scattered light by the optical antenna 6 will be longer than the local oscillator light path length $L_L$.

$$L_S > L_L \qquad (1)$$

Here, the signal light path length $L_S$ of the internally scattered light of the optical antenna 6 and the local oscillator light path length $L_L$ are both defined as the lengths from the polarization-keeping optical coupler 2 to the balanced receiver 9.

The reception light and the local oscillator light are combined at the polarization-keeping optical coupler 8 and then received by the balanced receiver 9 (S207). In the present embodiment, an example shows the case where the balanced receiver 9 consists of two photo diodes (PD) for heterodyne detection, while a single optical receiver that consists of a single photo diode (PD) for heterodyne detection can be applied. The balanced receiver 9 has an advantage to suppress the intensity noise that comes from the light source, so that its reception sensitivity is higher than that of the single optical receiver. The processing of the balanced receiver 9 is a part of the optical heterodyne receiver's processing that performs heterodyne detection for the reception light by using its local oscillator light. The reception signal 18 received by the balanced receiver 9 is processed by the signal detection circuit 12 that detects a peak exceeding a threshold value, so that a signal of scattered light from the target 20 is detected (S208). The signal processing unit 13 measures the propagation time of the scattered light from the target 20, thereby measuring the distance to the target 20 and the like (S209).

Figure 4:
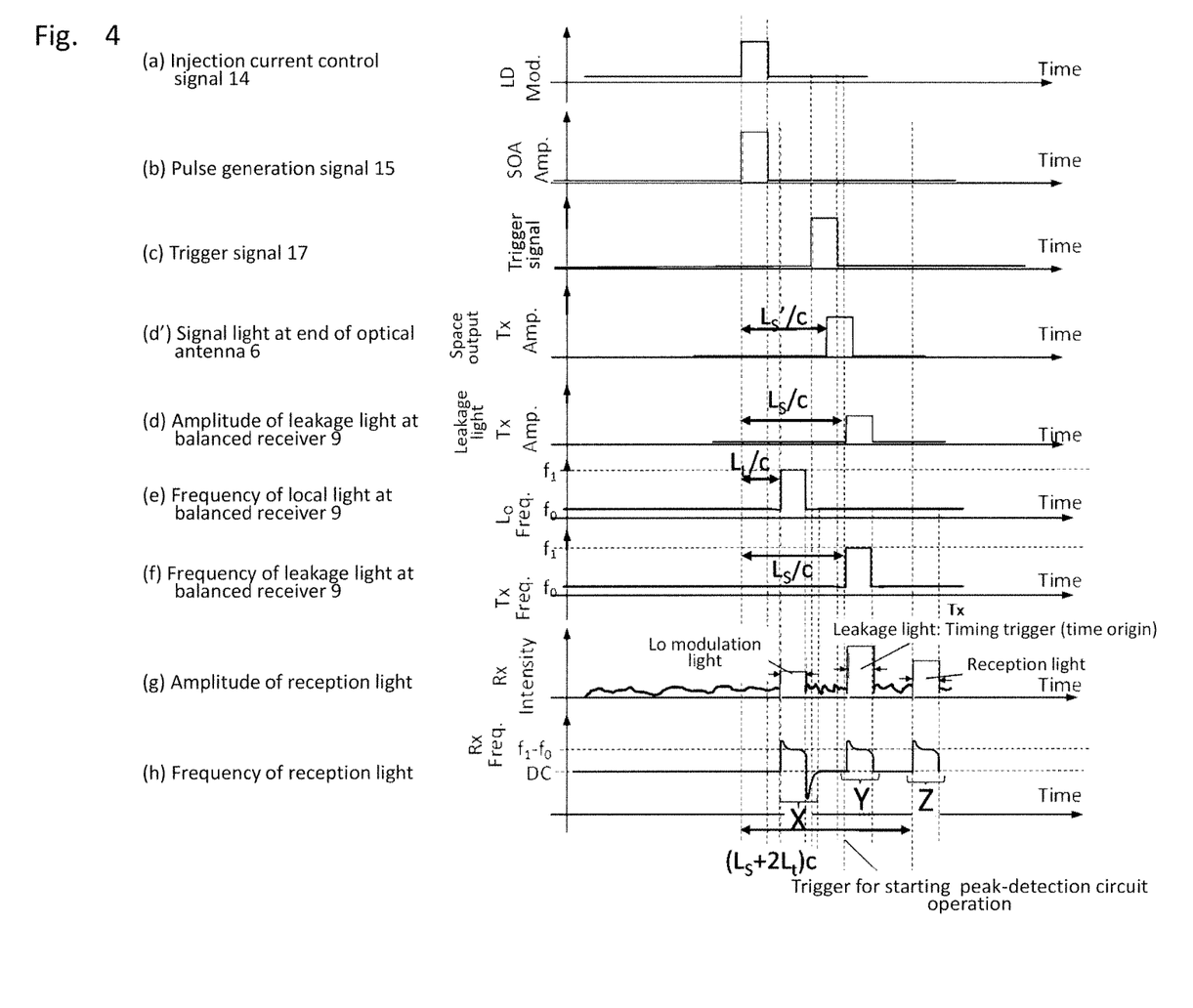
FIG. 4 are graphs for illustrating signals relevant to Embodiment 1 of the present invention.

FIG. 4 are graphs for illustrating signals in the laser radar system. The time-series-signal generation unit 10 applies, at the same timing, the injection-current control signal 14 for LD direct modulation (FIG. 4 (a)) and the pulse generation signal 15 (FIG. 4 (b)) for direct modulation in the semiconductor optical amplifier 3. Thus, signal light Tx to be outputted from the optical antenna 6 becomes a frequency-shifted pulsed-light. When it is assumed that the light path length from the semiconductor optical amplifier 3 to the end of the optical antenna 6 is $L_S'$ ($<L_S$), the signal light (FIG. 4 (d')) outputted into space from the end of the optical antenna 6 delays by a time of $L_S'/c$ from the modulation performed in the semiconductor optical amplifier 3.

The amplitude of leakage light at the balanced receiver 9 is shown in FIG. 4 (d) and the frequency of the leakage light is shown in FIG. 4 (f).

Here, internal scattering light from the optical antenna 6 or leakage light from the optical circulator 5 delays by a time of $T_S$ from the time when the injection-current control signal 14 is applied, and enters the balanced receiver 9.

$$T_S = L_S/c \quad c: \text{the light speed} \quad (2)$$

On the other hand, the local oscillator light (FIG. 4 (e)) delays by a time of $T_L$, to enter the balanced receiver 9.

$$T_L = L_L/c$$

Here, the following relation holds due to the light path length adjustment means 7.

$$T_L < T_S$$

Therefore, the graphs of the amplitude (FIG. 4 (g)) and frequency (FIG. 4 (h)) of the reception signal show that signals are detected in the following three time regions: a time region X when the modulated local oscillator light appears; a time region Y when the modulated signal light (internally-scattered-light from the optical antenna 6) appears; and a time region Z when the scattered light from the target 20 returns. In other words, the local oscillator light is, during the time region X, in a state at which it is modulated into the first frequency f1; and the local oscillator light is, during the time regions Y and Z, in a state at which it is modulated into the second frequency f0. The signal light (the internally scattered light from the optical antenna 6) is, during the time region Y, in a state at which it is modulated into the first frequency f1; and the signal light is, in the time regions X and Z, in a state at which it is modulate into the second frequency f0. The scattered light from the target 20 is, during the time region Z, in a state at which it is modulated into the first frequency f1; and the scattered light is, during the time regions X and Y, in a state at which it is modulated into the second frequency f0. This is because the local oscillator light, the signal light (the internally scattered light from the optical antenna 6) and the scattered light from the target 20 have delays different from each other. Therefore, the reception signals in the time regions Y and Z are results of heterodyne detection which is performed, in a state of the local oscillator light having the second frequency f0, on the internally scattered light having the first frequency f1 and coming from the optical antenna 6 and on the scattered light having the first frequency f1 and coming from the target 20, respectively. In the present embodiment, the heterodyne detection is performed by using light of frequency f0 as the local oscillator light and light of frequency f1 as the signal light. The frequency f0 is the second frequency of the output light of the frequency modulated reference light source 1, and the frequency f1 is the first frequency thereof.

The time-series-signal generation unit 10 generates a trigger signal 16. The trigger signal 16 is delayed by the delay adjustment circuit 11 such as a phase shifter to be a trigger signal 17 (FIG. 4 (c)), which determines the timing to start operations of the signal detection circuit 12. Here, the trigger signal 17 is set between the modulated local oscillator light reception (the time region X in FIG. 4) and the signal light leakage reception (the time region Y in FIG. 4). The signal-light leakage signal (the time region Y in FIG. 4) is used as the distance detection origin. In a case when the trigger signal 17 is used for the measurement start point, it is impossible to distinguish the delay by the signal light path length $L_S$ from the delay by the distance to the target 20. Instead, by using the leakage light of the optical antenna 6 (internally-scattered-light) for the timing trigger of the measurement start, the light propagation time from the output end of the optical antenna 6 to the target 20 can be detected; and thus, the distance from the optical antenna 6 to the target 20 can be detected accurately. To be more specific, when it is assumed that the distance from the optical antenna 6 to the target 20 is $L_t$, the scattered light received from the target 20 has a delay of $(L_S + 2L_t)/c$. Therefore, the propagation time $2L_t/c$ can be detected by using the leakage light having a delay of $L_S/c$, as a timing trigger.

In general, when light propagates through the signal light path formed by the optical fiber, the environment temperature etc. has an influence to vary the light path length. In a case when the trigger signal 17 is used for the measurement start point, the variation of the light path length cannot be corrected. On the other hand, in the configuration used in the present invention, it is possible to perform the above-mentioned measurement without any correction of the measurement start point even when the environment temperature changes.

In general, the DFB-LD achieves a fast response to a modulation signal. Its typical response time is less than one nanosecond. It also realizes a frequency shift of one gigahertz or larger. This makes it possible to perform heterodyne detection on pulse signals having a short pulse width of nanosecond order. On the other hand, a conventional optical frequency shifter has a response band less than 1 MHz and a shift amount less than 1 GHz. Therefore, it is difficult to perform heterodyne detection on pulse signals having a short pulse width of nanosecond order.

As described above, in this configuration, the light with a burst-pulse frequency shift by direct modulation on LD (laser diode) is used as reference light; for signal light and local oscillator light which are obtained by splitting the reference light into two, the signal light path is set to be longer than the local oscillator light path; and the light scattered internally in the signal light path is used as the timing trigger for the measurement start.

This configuration makes it possible to perform heterodyne detection on short pulses of nanosecond order, which was impossible in conventional ways, and also makes it possible to detect the distance from the optical antenna 6 to the target 20 without depending on the signal light path length.

As so far described, a laser radar system 100 according to the present invention includes: a semiconductor laser being a reference light source 1 to output first light having a first frequency f1 in a first period and second light having a second frequency f0 in a second period; an optical splitter such as a polarization-keeping optical coupler 2 to split the first light and the second light outputted from the semiconductor laser into signal light and local oscillator light; an optical modulator to modulate the signal light into pulsed light; an optical antenna 6 to radiate the pulsed light modulated by the optical modulator into space and to receive, as reception light, scattered light of the pulsed light from a target 20; an optical heterodyne receiver to perform, using the local oscillator light, heterodyne detection on the reception light; and a measurement unit 30 to measure a distance to the target 20 by using the reception signal 18 detected through the heterodyne detection performed by the optical heterodyne receiver, wherein the optical heterodyne receiver performs heterodyne detection on the reception light of the first light by using the local oscillator light of the second light. This configuration makes it possible to produce a frequency shift between the local oscillator light and the signal light, the frequency shift being larger than that produced by a conventional technology in which an optical frequency shifter is used. Thus, this configuration can realize the laser radar system 100 having a high-resolution detection by performing heterodyne detection using pulsed light of a short pulse width. To be more specific, the frequency shift of 1 GHz or larger can be realized, and thus, it becomes possible to perform heterodyne detection using pulsed light of a short pulse width of nanosecond order. Also, in comparison to conventional systems using an optical frequency shifter for shifting a frequency, it is possible to further downsize or integrate the system that performs heterodyne detection method using this configuration.

The laser radar system 100 according to the present embodiment is characterized in that the measurement unit 30 measures the propagation time of the scattered light from the target 20, to thereby measure the distance from the laser radar system to the target 20. This configuration makes it possible to measure the distance to the target 20 with a resolution or a sensitivity higher than that of conventional technologies.

The laser radar system 100 according to the present embodiment is further characterized in that the measurement unit 30 uses, as the time for starting measurement, a time when the measurement unit 30 detects internally-scattered-light produced by the pulsed light's scattering in the laser radar system, to measure the propagation time of the scattered light from the target 20. Even when the environmental temperature varies, this configuration makes it possible to perform measurement without correcting the measurement start point. In conventional technologies in which the measurement start time has to be predetermined, expansion or contraction of the light propagation path influences the measurement results. On the other hand, in the present embodiment's configuration, expansion or contraction of the light propagation path gives no influence to a result of measuring a distance if the difference between a detection time of the internally scattered light and that of the scattered light from the target 20 remains the same. Therefore, the present embodiment has an advantage in that the measured values are not influenced even when the light propagation path expands or contracts.

Also, the laser radar system 100 according to the present embodiment is characterized in that the light path length $L_S$ of the internally scattered light is longer than the light path length $L_L$ of the local oscillator light. In this configuration, the length difference between the light path of the signal light and that of the local oscillator light is set so as for the signal light path to be longer, and the internally scattered light produced in the signal light path is used as a trigger timing for starting measurement. This configuration makes it possible to perform heterodyne detection using short pulses of nanosecond order, which has been previously difficult.

Also, the laser radar system 100 according to the present embodiment is characterized in that between a time when the local oscillator light has a first frequency of f1 in the measurement unit 30 and a time when the internally scattered light produced by the pulsed light's scattering in the laser radar system 100 has the first frequency of f1 in the measurement unit 30, the measurement unit 30 receives a trigger signal 17 for starting detecting a specific signal included in the reception signal 18, to start the detection. Here, the detection of a specific signal means, for example, to detect a signal whose amplitude is a threshold value or larger. This configuration make it possible to detect signals limited to the internally scattered light and the scattered light from the target 20, each of which is required for measuring the distance characteristic of the target 20, and to thereby effectively perform signal processing.

Also, the laser radar system 100 according to the present embodiment is characterized in that the laser radar system includes the delay adjustment circuit 11 to adjust the delay time of the trigger signal 17. This configuration makes it possible to delay the trigger signal 17 so that the trigger signal will be set between a time when the local oscillator light has a first frequency of f1 in the measurement unit 30 and a time when the internally scattered light produced by the pulsed light's scattering in the laser radar system has the first frequency of f1 in the measurement unit 30.

Also, the laser radar system 100 according to the present embodiment is characterized in that the laser radar system includes the light path length adjustment unit, which is a light path length adjustment means 7 to adjust the light path length of the pulsed light. This configuration makes it possible that the signal light path length $L_S$ of the internally scattered light in the optical antenna 6 is set to be longer than the local oscillator light path length $L_L$, whereby the local oscillator light earlier propagates to the balanced receiver 9. As a result, this makes it possible that the measurement unit 30 does not detect the local oscillator light in a period from when detecting the internally scattered light of the optical antenna 6 to when detecting the scattered light from the target 20, which leads to an accurate measurement of time from when detecting the internally scattered light of the optical antenna 6 to when detecting the scattered light from the target 20.

Also, the laser radar system 100 according to the present embodiment is characterized in that a modulated current is injected to a light source being the reference light source 1 so that the light source will output light having a first frequency of f1 and a second frequency of f0. This configuration makes it possible to perform frequency modulation within a time shorter than a conventional technique in which an optical frequency shifter is used for performing frequency modulation and for giving a frequency difference between the signal light and the local oscillator light. This configuration makes it possible to produce a larger frequency difference between the signal light and the local oscillator light. As a result, the laser radar system 100 can be realized which uses short-pulse-width light to perform a high-resolution measurement.

Also, the laser radar system 100 according to the present embodiment is characterized in that the semiconductor laser used as the reference light source 1 is a distributed feedback laser diode (DFB-LD). In this configuration, in accordance with the injection-current control signals 14 controlled in a burst pulse manner, the light from the reference light source 1 can be outputted at a frequency of f1 only for the pulse ON period and outputted at a frequency of f0 for the pulse OFF period, which leads to efficient frequency modulation.

Embodiment 2

In Embodiment 1, the distance to the target 20 is detected from peaks of the reception signal 18, each of which is equal to or larger than a certain fixed threshold value; in this embodiment, the reception signal 18 is converted into a digital signal, and then the frequency components after the digital conversion are analyzed to detect the movement speed of the target 20, the movement speed being not capable of being detected in Embodiment 1.

Figure 5:
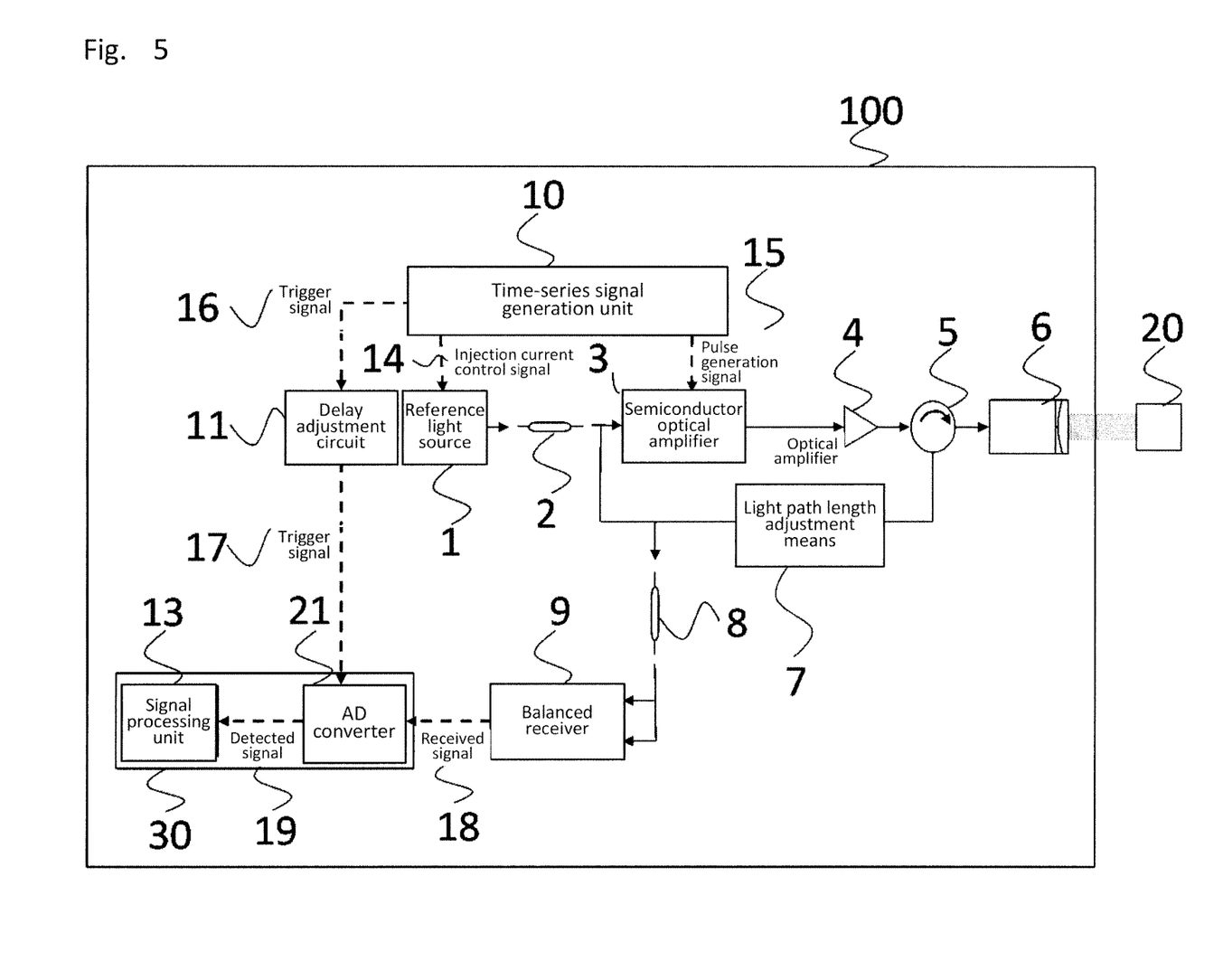
FIG. 5 is a configuration diagram of a laser radar system 100 according to Embodiment 2 of the present invention.

FIG. 5 shows a configuration diagram of a laser radar system 100 according to the present embodiment. In FIG. 5, the signal detection circuit 12 in FIG. 1 is replaced by an analog-to-digital (AD) converter 21.

Figure 6:
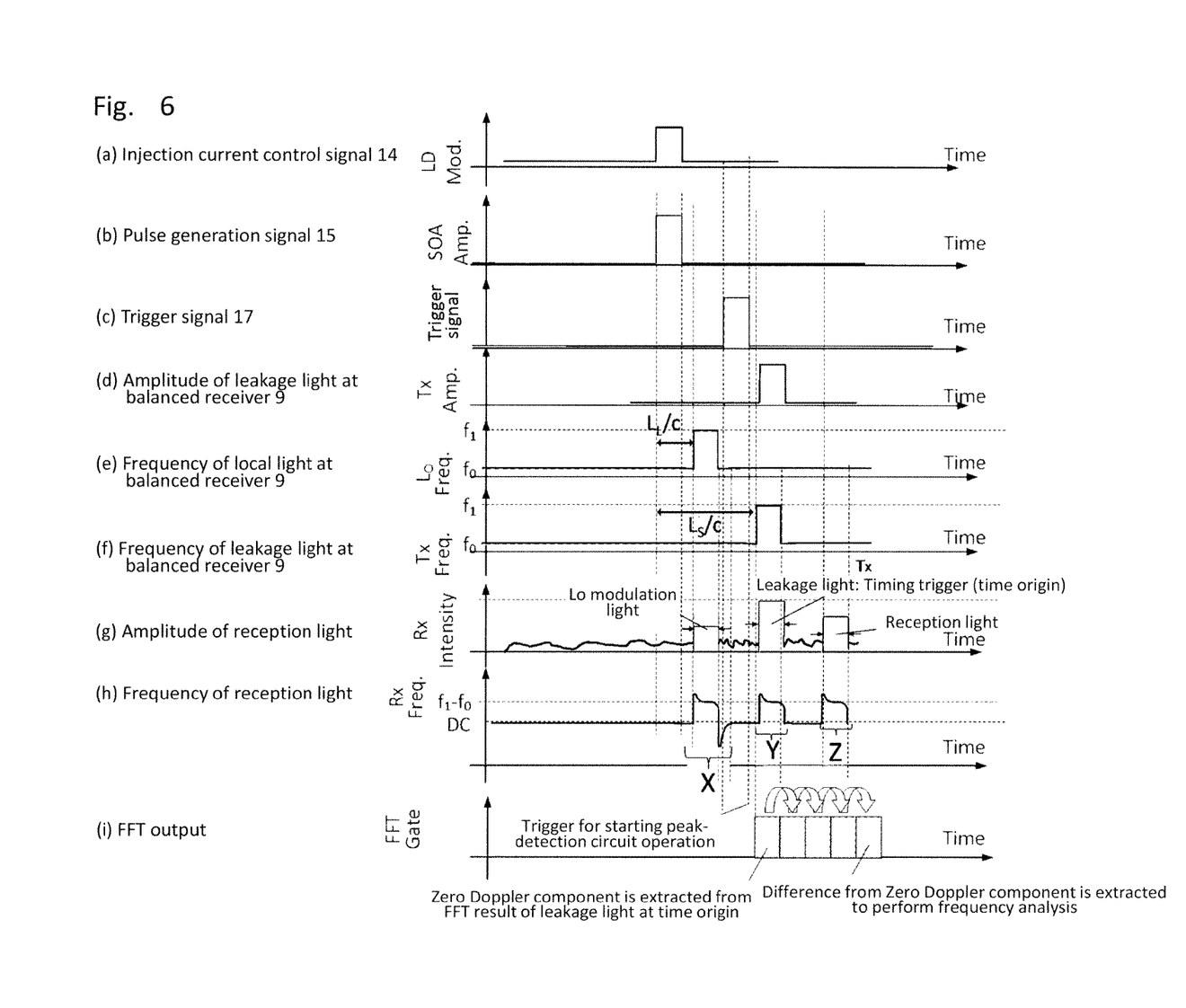
FIG. 6 are graphs for illustrating signals relevant to Embodiment 2 of the present invention.

FIG. 6 are graphs for illustrating the relevant signals. In the present embodiment, AD conversion is performed on the reception signal, and then Fast Fourier Transform (FFT) is performed to detect frequency components. In this method in which direct modulation is performed using an LD, a frequency shift amount produced by the LD direct modulation varies due to environmental temperature etc.; therefore, it is impossible to distinguish between the Doppler frequency shift produced by the movement of the target 20 and a frequency shift amount caused by such environmental temperature etc.

Here the movement of the target 20 does not affect the leakage light produced by the internal scattering in the optical antenna 6 etc., which makes it possible to detect the frequency shift (of zero-Doppler) of the LD light.

As shown in FIG. 6 (i), the zero Doppler component is extracted from the FFT results of the zero point (leakage light); the difference between the frequency component obtained from the zero Doppler and that obtained from the scattered light from the target 20 is extracted, and frequency analysis is performed for the difference therebetween, whereby the distance to the target 20 and the movement speed thereof can be detected independently of the environmental temperature.

As so far described, a laser radar system 100 according to the present invention includes: a semiconductor laser being a reference light source 1 to output first light having a first frequency f1 in a first period and second light having a second frequency f0 in a second period; an optical splitter such as a polarization-keeping optical coupler 2 to split the first light and the second light outputted from the semiconductor laser into signal light and local oscillator light; an optical modulator to modulate the signal light into pulsed light; an optical antenna 6 to radiate the pulsed light modulated by the optical modulator into space and to receive, as reception light, scattered light of the pulsed light from a target 20; an optical heterodyne receiver to perform, using the local oscillator light, heterodyne detection on the reception light; and a measurement unit 30 to measure a movement characteristic of the target 20 by using the reception signal 18 detected through the heterodyne detection performed by the optical heterodyne receiver, wherein the optical heterodyne receiver performs heterodyne detection on the reception light of the first light by using the local oscillator light of the second light.

In this configuration, the reference light source 1 can produce an optical frequency shift larger than that by a conventional technique in which an optical frequency shifter produces a frequency difference between the signal light and the local oscillator light. As the result, by using the pulsed light having a short pulse width for heterodyne detection, it is possible to realize a laser radar system 100 capable of detecting the movement speed of the target 20 in a wide range (wide frequency range).

Also, in the laser radar system 100 according to the present embodiment, the measurement unit 30 is characterized in that the measurement unit measures the frequency of the scattered light from the target 20 to thereby measure the movement speed of the target 20.

This configuration makes it possible to measure the movement speed of the target 20 in a resolution range higher than conventional technologies.

Also, in the laser radar system 100 according to the present embodiment, the measurement unit 30 is characterized in that the measurement unit measures the difference between the frequency of the internal light produced by the pulsed light scattering within the laser radar system and the frequency of the scattered light from the target 20 to measure the movement velocity of the target 20.

Therefore, even in the environment where it is impossible to distinguish between the Doppler frequency shift included in the scattered light from the target 20 and the frequency shift amount produced by the environmental temperature etc., this configuration makes it possible to detect, from the internally scattered light, the frequency shift amount produced by the environmental temperature etc., and to thereby measure the Doppler frequency shift included in the scattered light from the target 20 with high accuracy.

DESCRIPTION OF SYMBOLS

1: reference light source, 2: polarization-keeping optical coupler, 3: semiconductor optical amplifier, 4: optical amplifier, 5: polarization-keeping optical circulator, 6: optical antenna, 7: light path length adjustment means, 8: polarization-keeping optical coupler, 9: balanced receiver, 10: time-series-signal generation unit, 11: delay adjustment circuit, 12: signal detection circuit, 13: signal processing unit, 14: injection-current control signal, 15: pulse generation signal, 16: trigger signal, 17: trigger signal (after delay adjustment), 18: reception signal, 19: detected signal, 20: target, 21: AD converter 30: measurement unit, 50: local oscillator light path, 51: reception light path, 100: laser radar system

The invention claimed is:
1. A laser radar system comprising:
a semiconductor laser to output first light having a first frequency in a first period and second light having a second frequency in a second period;
an optical splitter to split the first light and the second light outputted from the semiconductor laser into signal light and local oscillator light;
an optical modulator to modulate the signal light into pulsed light;
an optical antenna to radiate the pulsed light modulated by the optical modulator into space and to receive, as reception light, scattered light of the pulsed light from a target;
an optical heterodyne receiver to perform, using the local oscillator light, heterodyne detection on the reception light; and
measurement circuitry to measure a propagation time of the scattered light from the target with its measurement start time that is a time when the measurement circuitry detects internally-scattered-light which is caused by the pulsed light's scattering in the laser radar system and to thereby measure a distance to the target by using a reception signal detected through the heterodyne detection performed by the optical heterodyne receiver, wherein the optical heterodyne receiver performs heterodyne detection on the internally-scattered-light of the first light and the reception light of the first light by using the local oscillator light of the second light, and wherein a light path length of the internally-scattered-light is longer than a light path length of the local oscillator light.

2. The laser radar system according to claim 1, wherein within a period between a time when the local oscillator light has the first frequency at the measurement circuitry and a time when internally-scattered-light caused by the pulsed light's scattering in the laser radar system has the first frequency at the measurement circuitry, the measurement circuitry receives a trigger signal to start an operation to detect a specific signal included in the reception signal and then starts the operation.

3. The laser radar system according to claim 2, further comprising a delay adjustment circuit to adjust a delay time of the trigger signal.

4. The laser radar system according to claim 1, further comprising light path length adjuster to adjust a light path length of the pulsed light.

5. The laser radar system according to claim 2, further comprising light path length adjuster to adjust a light path length of the pulsed light.

6. The laser radar system according to claim 3, further comprising light path length adjuster to adjust a light path length of the pulsed light.

7. The laser radar system according to claim 1, wherein the semiconductor laser outputs light having the first frequency and light having the second frequency by injection of a modulated current.

8. The laser radar system according to claim 2, wherein the semiconductor laser outputs light having the first frequency and light having the second frequency by injection of a modulated current.

9. The laser radar system according to claim 3, wherein the semiconductor laser outputs light having the first frequency and light having the second frequency by injection of a modulated current.

10. The laser radar system according to claim 4, wherein the semiconductor laser outputs light having the first frequency and light having the second frequency by injection of a modulated current.

11. The laser radar system according to claim 1, wherein the semiconductor laser performs continuous oscillation at a single wavelength.

12. The laser radar system according to claim 2, wherein the semiconductor laser performs continuous oscillation at a single wavelength.

13. The laser radar system according to claim 3, wherein the semiconductor laser performs continuous oscillation at a single wavelength.

14. The laser radar system according to claim 4, wherein the semiconductor laser performs continuous oscillation at a single wavelength.

15. The laser radar system according to claim 7, wherein the semiconductor laser performs continuous oscillation at a single wavelength.

16. The laser radar system according to claim 1, wherein the semiconductor laser includes a distributed feedback laser diode (DFB-LD).

17. The laser radar system according to claim 2, wherein the semiconductor laser includes a distributed feedback laser diode (DFB-LD).

18. The laser radar system according to claim 4, wherein the semiconductor laser includes a distributed feedback laser diode (DFB-LD).

19. The laser radar system according to claim 7, wherein the semiconductor laser includes a distributed feedback laser diode (DFB-LD).

20. The laser radar system according to claim 11, wherein the semiconductor laser includes a distributed feedback laser diode (DFB-LD).

* * * * *